UNITED STATES PATENT OFFICE.

EDWARD BRADFORD MAXTED, OF WALSALL, ENGLAND.

MANUFACTURE OF PURE HYDROGEN.

1,253,622.  Specification of Letters Patent.  Patented Jan. 15, 1918.

No Drawing.  Application filed July 17, 1916. Serial No. 109,783.

*To all whom it may concern:*

Be it known that I, EDWARD BRADFORD MAXTED, a subject of the King of Great Britain, residing at Charles Street Works, Walsall, in the county of Stafford, England, have invented certain new and useful Improvements in the Manufacture of Pure Hydrogen, of which the following is a specification.

According to a well known industrial method of preparing hydrogen, water gas or a similar commercial reducing gas is passed over heated iron oxid, whereby a partial reduction of the iron oxid to the metallic condition is obtained. The passage of the reducing gas is then disconnected and steam led over the reduced iron with liberation of hydrogen and reformation of iron oxid, which is again subjected to the cycle of reactions. It is found in practice, however, that the hydrogen prepared by such a method contains considerable quantities of impurities, notably of carbon monoxid, and that the presence of these impurities renders the hydrogen unsuitable for certain purposes, especially catalytic reactions, which form a very important use for the gas in chemical industry. The principal reason for the presence of carbon monoxid in the hydrogen lies in the fact that, in the reducing phase, carbon is deposited from the carbon monoxid and other carbon-containing constituents of the water gas employed for reduction of the iron oxid. This carbon, which may be present either in the elementary condition or as carbid, persists into the steaming phase and enters into the reactions, with the formation of carbon monoxid or other carbon compounds which, under the conditions of working, pass more or less completely into carbon monoxid, thereby contaminating the hydrogen.

According to this invention we prevent the contamination of the hydrogen by the carbon monoxid, by using for the reduction of the iron oxid a reducing gas without admixture of steam and in which carbon dioxid is present in substantially larger proportions than carbon monoxid. The proportions must be such as to prevent the deposition of carbon from the monoxid, and in practice, at the usual temperature of working, a suitable proportion is found to be two volumes of carbon dioxid to one volume of carbon monoxid. A still higher dioxid-monoxid ratio may, however, be employed.

The reducing gases usually employed are manufactured with the object of producing a minimum content of the dioxid and a maximum content of the monoxid and for the purposes of our invention we may either add a sufficient proportion of carbon dioxid to the ordinary commercial reducing gas or we may arrange the manufacture of the gas so as to give the large proportion of carbon dioxid desired.

It is advisable, in order that the maximum yield of hydrogen shall be obtained, that the reducing gases should contain as small as possible a percentage of diluting gas such as nitrogen, and still more important that oxidizing gases such as air or steam in appreciable proportions should be absent from the reducing gases.

In order to manufacture reducing gas of the nature necessary for the above invention, I either take water gas, or other suitable commercial reducing gas, and mix with it sufficient carbon dioxid in order to bring up the volume of carbon dioxid, in the mixture resulting, to a percentage substantially larger than the carbon monoxid content of the resulting mixture, or I modify the manufacture of the water gas in such a way that a gas containing a substantially larger proportion of carbon dioxid than monoxid is produced, for instance by the use of an excess of steam or a lower temperature in the water gas generator itself, or by allowing the gases after leaving the incandescent coke to pass through a zone at a lower temperature, say from 400–800° C., filled with suitable catalytic material, for instance iron oxid.

In no case is there produced a reducing gas of the composition required by the introduction of air or steam into the retorts during the reducing phase, such practice being found, as already mentioned, to be incapable of giving absolutely pure hydrogen, and further being found to reduce very considerably the output of the hydrogen furnace.

The process is carried out as in the usual intermittent process for producing hydrogen by alternating reduction of the iron oxid and treatment by steam, the temperature (maintained by external heating) and plant employed being similar to those employed in the ordinary practice.

What I claim and desire to secure by Letters Patent of the United States is:—

1. A process for the production of hydrogen by alternate reduction of heated iron oxid by a reducing gas containing carbon monoxid and reoxidation by steam, which consists in treating the iron oxid with a reducing gas without admixture of air or steam, such reducing gas containing substantially larger proportions of carbon dioxid than of carbon monoxid and in subsequently passing steam over the reduced iron in a heated condition so as to liberate hydrogen.

2. A process for the production of hydrogen by alternate reduction of heated iron oxid by a reducing gas containing carbon monoxid and reoxidation by steam, which consists in heating the iron oxid by external means, treating the iron oxid with a reducing gas without admixture of air or steam, such reducing gas containing substantially larger proportions of carbon dioxid than of carbon monoxid and in subsequently passing steam over the reduced iron in a heated condition, so as to liberate hydrogen.

3. A process for the production of hydrogen by alternate reduction of heated iron oxid by a reducing gas containing carbon monoxid and reoxidation by steam, which consists in treating the iron oxid with a reducing gas without admixture of air or steam, such reducing gas containing not less than two parts by volume of carbon dioxid for each part of carbon monoxid and in subsequently passing steam over the reduced iron in a heated condition so as to liberate hydrogen.

EDWARD BRADFORD MAXTED.